(12) United States Patent
Stieger

(10) Patent No.: US 11,097,698 B2
(45) Date of Patent: Aug. 24, 2021

(54) WHEEL CHOCK TO BLOCK A STATIONARY WHEEL

(71) Applicant: Satcom Corporation SA, Lugano (CH)

(72) Inventor: Daniel Stieger, Muespach (FR)

(73) Assignee: SATCOM CORPORATION SA, Lugano (CH)

( * ) Notice: Subject to any disclaimer, the term of this patent is extended or adjusted under 35 U.S.C. 154(b) by 0 days.

(21) Appl. No.: 16/465,173

(22) PCT Filed: Dec. 1, 2017

(86) PCT No.: PCT/EP2017/081115
§ 371 (c)(1),
(2) Date: May 30, 2019

(87) PCT Pub. No.: WO2018/100130
PCT Pub. Date: Jun. 7, 2018

(65) Prior Publication Data
US 2019/0329742 A1    Oct. 31, 2019

(30) Foreign Application Priority Data
Dec. 2, 2016    (CH) ................................. 01580/16

(51) Int. Cl.
*B60T 3/00*    (2006.01)
*B64F 1/16*    (2006.01)

(52) U.S. Cl.
CPC . *B60T 3/00* (2013.01); *B64F 1/16* (2013.01)

(58) Field of Classification Search
CPC ............... B64F 1/16; B60T 3/00; B60P 3/077
USPC .......................................................... 188/32
See application file for complete search history.

(56) References Cited

U.S. PATENT DOCUMENTS 1,082,807 A  * 12/1913  Holworthy
2,240,512 A  *  5/1941  Morgensen, Jr.
3,845,845 A  * 11/1974  Geisthoff
3,973,651 A  *  8/1976  Garrett

* cited by examiner

*Primary Examiner* — Robert A. Siconolfi
*Assistant Examiner* — San M Aung
(74) *Attorney, Agent, or Firm* — Hammer & Associates, P.C.

(57) ABSTRACT

The invention relates to a wheel chock for blocking a stationary wheel having a bottom surface (1) for resting on a floor and a wheel surface (2) for engagement with the wheel. The wheel surface (2) is provided for blocking the wheel angled to the bottom surface (1). The bottom surface (1) and wheel surface (2) are connected to each other via a hinge and designed to be foldable. A locking device is arranged movably on the bottom surface (1) and/or the wheel surface (2) and, in a locking position, locks the bottom surface (1) and wheel surface (2) in an unfolded, angled state.

12 Claims, 4 Drawing Sheets

WHEEL CHOCK TO BLOCK A STATIONARY WHEEL

Figure 1:
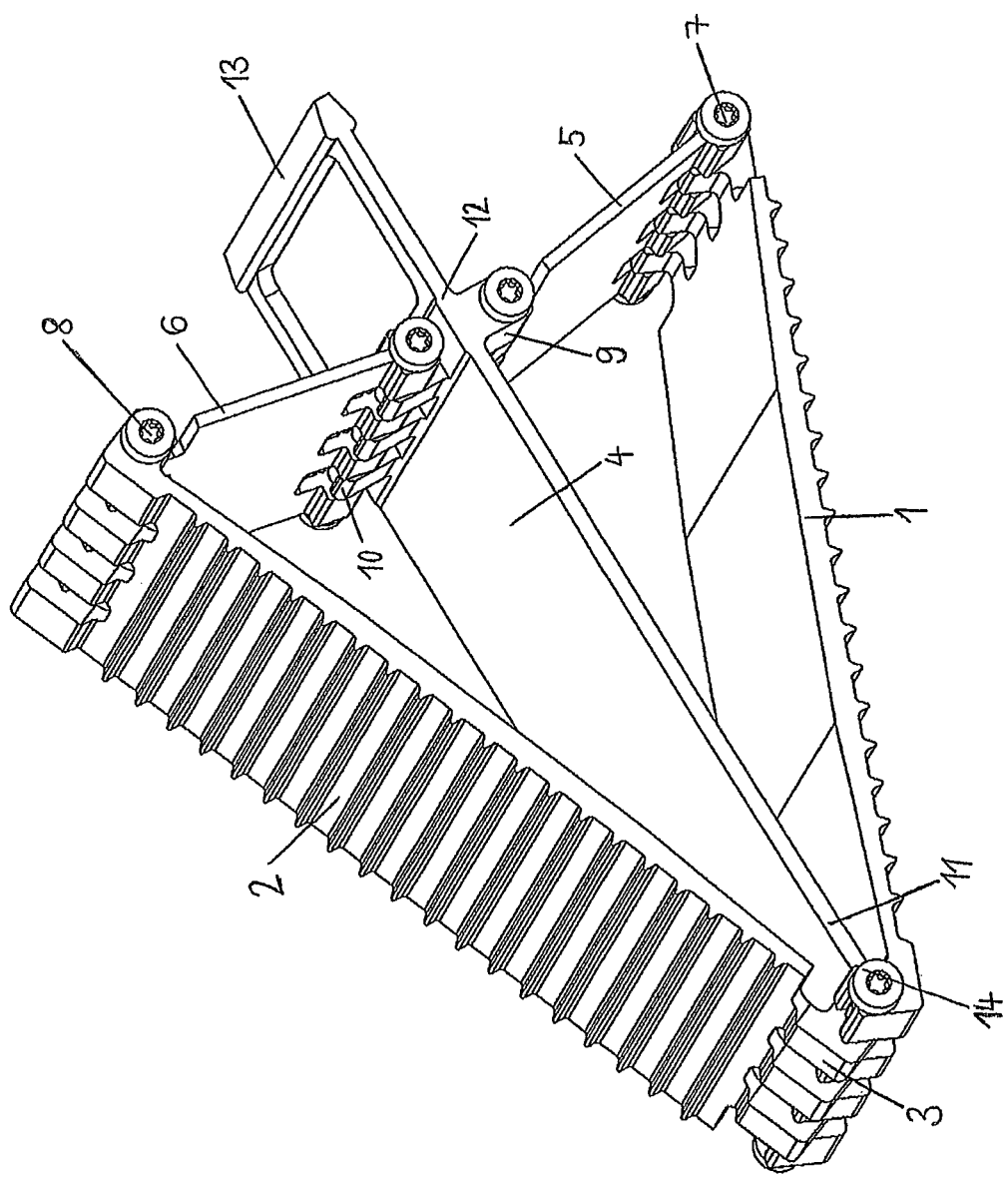

The invention relates to a wheel chock for blocking a stationary wheel, having a bottom surface for resting on a floor and a wheel surface for engaging the wheel, wherein the wheel surface for blocking the wheel is provided angled to the bottom surface.

To block the wheels of a vehicle or even an aircraft, it is known to insert a chock between at least one of the wheels and the ground, so that the wheel is blocked and prevented from rolling. Such chocks are also called drag shoes. There are different dimensions of wheel chocks, which are based on the application area of the wheel chock, in particular on the size of the wheel to be blocked. For improved securing of the vehicle or aircraft, wheel chocks are often provided on opposite sides of a wheel and on a number of wheels.

The wheel chocks must withstand a large force when a force is transmitted from the vehicle or airplane via the wheel on the wheel chock. They are therefore often heavy and clunky, so that they can only be transported and stowed under certain conditions. In particular, when multiple wheel chocks are used to secure the vehicle or aircraft, the wheel chocks take up a lot of space when stowed.

From DE 202008008588, for example, a wheel chock is known which is predominantly made of plastic. However, for reliable securing of the chock, portions are made of metal so that the weight advantage of the plastic is reduced. The wheel chock is formed as usual as a triangular block and therefore consumes a lot of storage space during storage.

It is an object of the present invention to provide a wheel chock which enables reliable wheel blocking, takes up little space in storage, is easy to handle and has a sturdy construction.

This object is achieved according to the invention by a wheel chock according to claim 1. Advantageous designs and different embodiments of the invention will become apparent from the dependent claims.

A wheel chock for blocking a stationary wheel according to the present invention comprises a bottom surface for resting on ground, e.g. a road, and a wheel surface to rest on the wheel to be blocked. According to the invention, the wheel surface and bottom surface are connected to each other via a hinge, so that the wheel chock is designed foldable, i.e. wheel and bottom surface can be folded up. In a use position, the wheel chock is unfolded and the wheel surface and bottom surface are angled to each other to block the wheel. In a folding position, the wheel surface and the bottom surface are folded up and are at least approximately parallel to each other.

According to the invention, a locking device on the bottom surface and/or the wheel surface is arranged such that it locks bottom surface and wheel surface in a locking position in a folded, angled state and in a folded position of the wheel chock it releases the bottom surface and wheel surface for folding up.

By folding up, the volume of the wheel chock can be significantly reduced, so that its space requirement is reduced during storage. Furthermore, a number of wheel chocks can be stacked on each other in the flat folded position. In use for blocking a wheel, the wheel chocks are securely fixed in their wedge shape by the locking device and provide reliable blocking of the wheel.

Wheel surface and bottom surface are preferably formed as rigid flat plates so that they can come to rest on one another in the folded state. Advantageously, the wheel surface and bottom surface are identical, so that the surfaces are identified only by their function. By simply turning the wheel chock, bottom and wheel surface are thus reversed. In principle, it is also possible that the plates have a slight curvature. Especially in the case of the wheel surface, therefore, the contact with the wheel can be improved.

In one embodiment, the locking device has at least one support beam, which is arranged articulated on the bottom or wheel surface and in a locking position supports the bottom surface and the wheel surface at an angle to one another. The support beam can be supported on the opposite surface, for example on the wheel surface, when the support beam is arranged on the bottom surface. Alternatively, the support beam may be supported on a surface of an additional component. To secure in the locked position, the support beam can be releasably fixed to the surface. For example, a stop or a plug or snap fixing can be provided.

In a further embodiment of the wheel chock according to the invention, the locking device has a rigid locking surface and at least one support beam. The locking surface, as an additional component to wheel and bottom surface, may be formed for example in the form of a plate or a rod. The support beam is articulated at its one end to the locking surface and at its other end hinged to the bottom or wheel surface. In a folding position of bottom and wheel surface, the locking surface and preferably also the support beam extend at least approximately parallel to the bottom or wheel surface. In the locking position, however, locking surface, support beams and bottom or wheel surface are arranged triangularly, i.e. they spread out into a wedge. It is emphasized that the locking surface is not attached directly to the wheel surface or the bottom surface, but is connected only via the support beam. The support beam serves as a pivot arm, with which the locking surface is movable relative to the bottom and wheel surface. In this case, the locking surface can be lifted from the wheel or bottom surface and simultaneously moved in parallel therewith. In addition, the support beam serves to support the locking surface in a locked position. As a result, the mobility of the wheel chock is improved and this can be folded up in a simple manner.

Advantageously, the locking surface in the locking position abuts with one end against a stop on the bottom or wheel surface; preferably against the bottom or wheel surface on which the support beam is movably mounted. Here the locking surface, support beams and bottom or wheel surface form a triangle. In the folded position, this end of the locking surface is removed from the stop and the wheel chock can be folded up. Advantageously, e.g. the hinge between the bottom surface and the wheel surface forms the stop. Thus, no additional structural measures are required to realize the stop.

In a preferred embodiment of a wheel chock according to the present invention, two support beams are provided, which are each mounted with each end on opposite sides of a locking surface. A first support beam is mounted with its other end on the bottom surface and a second support beam is mounted with its other end on the wheel surface. The arrangement thus forms a symmetrical, mirror-image geometry around the locking surface. As previously mentioned, advantageously, the bottom surface and the wheel surface may be identical so that they are interchangeable. The support beams have the same length, so that the locking surface is arranged centrally between the wheel and bottom surface. Due to the articulated connection of the locking surface with the wheel surface and the bottom surface by means of the support beam, the locking surface can be pulled out in the longitudinal direction of the wheel and bottom surface of these and pushed into it. This wheel and bottom surface are clamped umbrella-like or folded up. For clamping, the locking surface is pushed in between the wheel and bottom surface until it abuts the hinge. In this position, the wheel and bottom surfaces are locked in unfolded state and the wheel chock is ready to block a wheel.

In an advantageous embodiment of the wheel chock, the geometry between the bottom surface, the wheel surface and the support beam is designed such that a load of a wheel, which presses against the wheel surface, presses the wheel chock into its locking position. The wheel load basically acts in the normal direction of the wheel surface, i.e. perpendicular to the wheel surface. The lengths of the support beam, bottom surface and wheel surface are thus designed such that the load force is deflected into a force which presses the support beam, or the locking surface, into the locking position, in particular presses the locking surface against its stop. A force vector in the normal direction of the wheel surface thus encloses an angle with the at least one support beam such that the locking device is forced into a locking position.

In the above-described embodiment with two support beams mounted symmetrically on the locking surface, an angle between the support beams and the locking surface greater than 90° is provided for this purpose. Thereby, the force vector is at least partially transformed in the normal direction of the wheel surface into a thrust force, which pushes the locking surface into the stop, in this case against the hinge between the wheel surface and bottom surface. The wheel load thus serves as an additional means of securing the wheel chock in its wedge position, so that an unwanted collapse is prevented.

In a variant of a wheel chock according to the invention, at least the wheel surface and preferably also the bottom surface consists of aluminum. Particularly preferably, the entire wheel chock is made of aluminum. Aluminum allows a lightweight construction. In addition, aluminum allows the discharge of static charge from vehicles to the ground. Furthermore, there is no sparking if the wheel chock rubs over the ground. Furthermore, aluminum is impervious to soiling, such as oils, kerosene, deicing fluids, etc. that may be present on the ground.

Alternatively, the wheel chock is made of a stainless metal or a composite material. Stainless metals have the advantage that they are very robust and durable. Today's composite materials have sufficient rigidity to block a wheel and also allow a low weight of the wheel chock.

In one embodiment, the wheel chock advantageously exhibits spikes made of hard metal on the bottom surface to prevent slipping on a smooth or icy surface.

In yet another embodiment of the wheel chock according to the invention, the locking surface may have a handle at its end opposite the abutment end. The length of the locking surface is adjusted so that the handle protrudes in the locking position and in the folded position over the bottom surface and the wheel surface. Thus, the handle for actuating the locking surface is accessible both in the folded state and in the unfolded state of the wheel chock. With the handle, the locking surface can be pulled in a simple manner from the locked position, i.e. away from the stop. Wedging can thus be released quickly and the wheel chock can be stowed. Conversely, the wheel chock can be secured by advancing the handle in the direction of the wheel in the unfolded state. By advancing the handle, the locking surface is pushed against its stop.

In a further advantageous embodiment, the wheel chock on the locking surface comprises a releasable securing connection, which extends to secure the locking surface in the locking position of the locking surface in the direction of the stop. Preferably, the securing connection is designed as an elastic tension connection, for example as a rubber band. With the tensile force of the tensioned securing connection, the locking surface can be pressed against the stop. The securing connection can be fastened to the wheel chock itself, for example in the region of the stop or the hinge. Advantageously, the securing connection can also be attached to the wheel to be blocked by the wheel chock.

Preferably, a pair of wheel chocks are provided, each with a wheel chock positioned on opposite sides of a wheel. In this case, the securing connection may extend from one wheel chock to the opposite one and be secured thereto. The advantage here is that the same securing connection can be used for both wheel chocks by extending from a locking surface of one wheel chock to the locking surface of the opposite wheel chock. As a result, both wheel chocks can be secured simultaneously in their locked position and they can also be released simultaneously from this securing mechanism.

Figure 2:
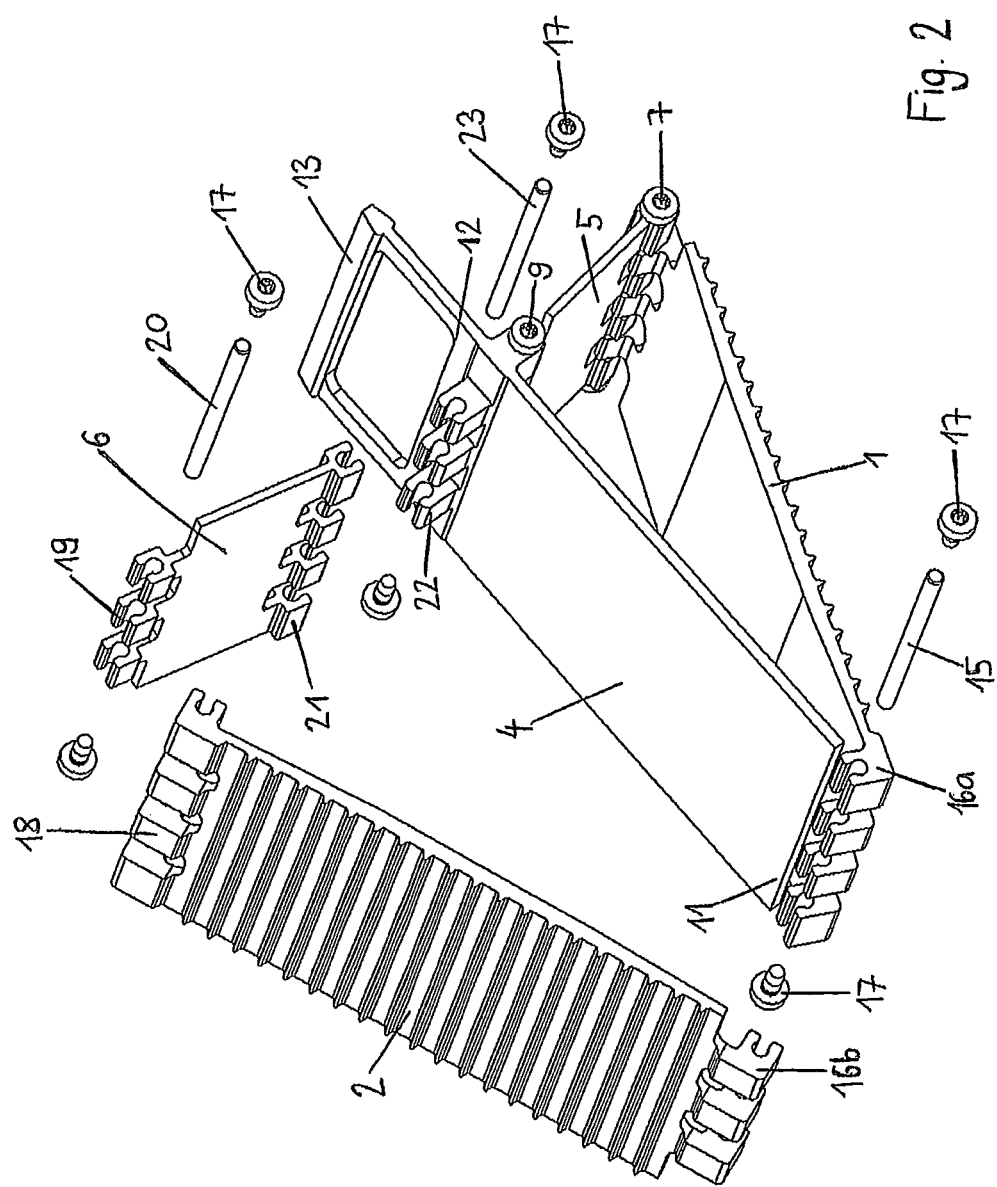
Figure 3:
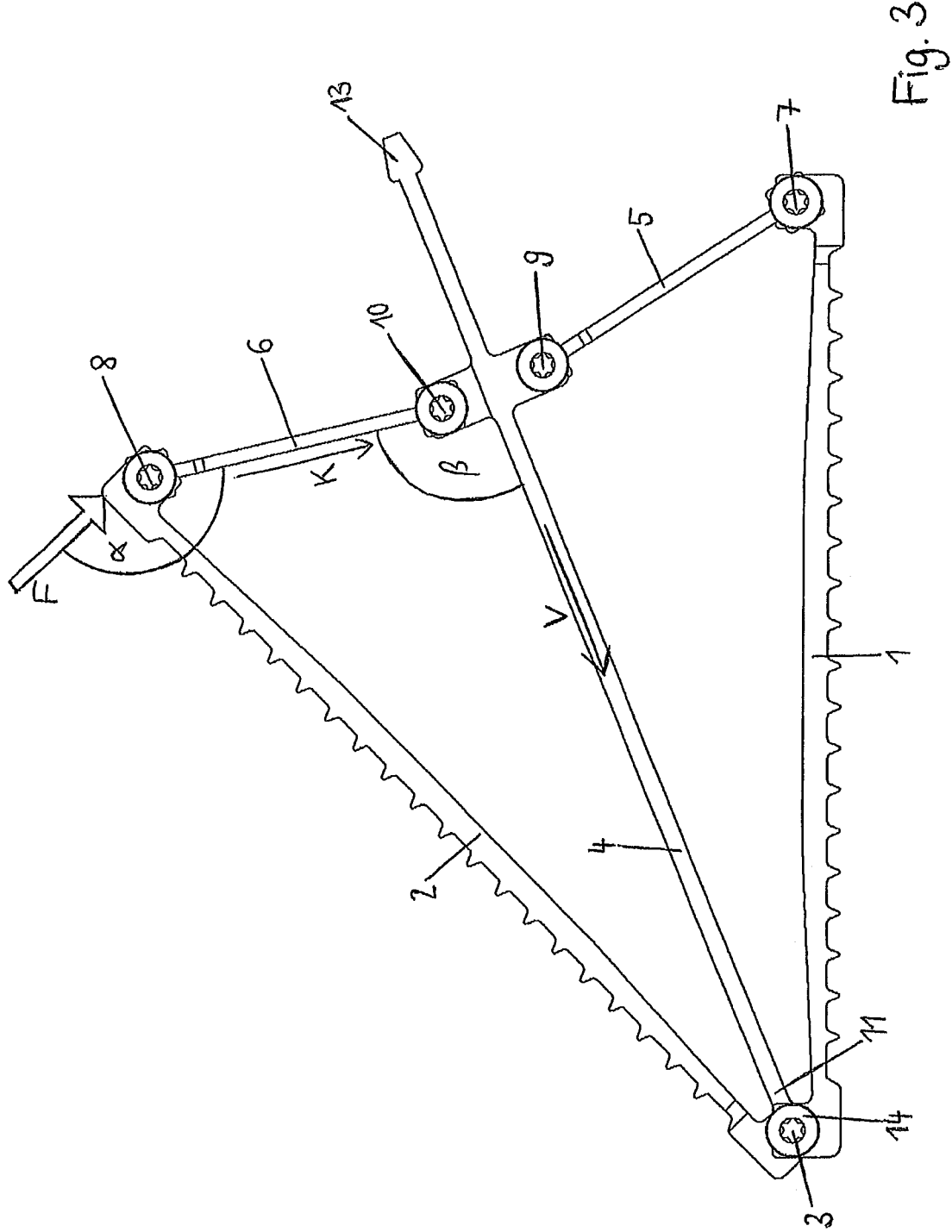
Figure 4:
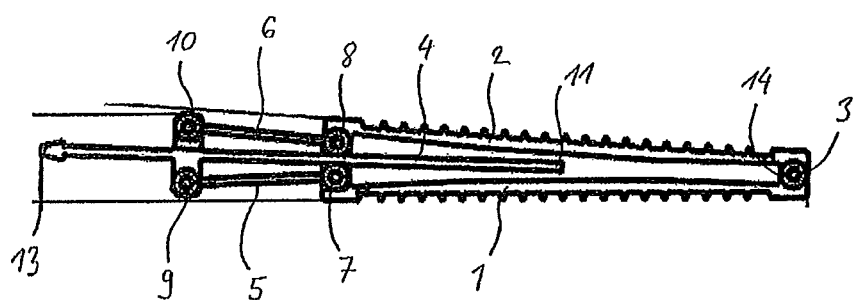

The invention is illustrated below with reference to the figures, which are only intended to illustrate and not to be construed restrictively. Features of the invention which will become apparent from the drawings are to be considered individually and in any combination as belonging to the disclosure of the invention. The drawings show:

FIG. 1 a three-dimensional representation of an embodiment of a wheel chock according to the present invention in unfolded state, FIG. 2 an exploded view of the wheel chock of FIG. 1, FIG. 3 a side view of the wheel chock of FIG. 1 and FIG. 4 an illustration of the wheel chock from FIG. 1 in the folded-up state.

In FIG. 1, an embodiment of a foldable wheel chock for blocking a stationary wheel according to the present invention is shown. The wheel chock has a bottom surface 1 and a wheel surface 2, which are connected at one end by means of a hinge 3. With the hinge 3, the bottom surface 1 and the wheel surface 2 can be opened relative to each other. The hinge is designed so that the inner surfaces of the bottom surface 1 and the wheel surface 2 can come to rest on each other.

Further, the wheel chock exhibits a locking device which is movably arranged on the bottom surface or the wheel surface. The locking device comprises a locking surface 4, a first support beam 5 and a second support beam 6. The support beams 5 and 6 are formed in this variant as rigid support plates. The first support beam 5 is pivotally mounted with a hinge 7 on the bottom surface 1 and indeed at the end which is opposite to the hinge 3. In a symmetrical manner, the second support beam 6 is pivotally mounted with a hinge 8 on the wheel surface 2, again at the end which is opposite to the hinge 3. At their ends opposite the joints 7 and 8, the first support beam 5 and the second support beam 6 are each mounted on the locking surface 4 via joints 9 and 10. The joints 9 and 10 are provided on opposite sides of the locking surface 4. A connection of the locking surface 4 with the bottom surface 1 or the wheel surface 2 is not provided.

By the support beams 5 and 6 and the joints 7, 8, 9 and 10, however, the movement of the locking surface 4 relative to the bottom surface 1 and wheel surface 2 is fixed. The locking surface 4 can be displaced parallel to the bottom surface 1 and the wheel surface 2 and the support beams 5 and 6 are pivoted relative thereto. A first end 11 of the locking surface 4 projects in the direction of the hinge 3 between the bottom surface 1 and the wheel surface 2. At the second, opposite end 12 of the locking surface 4, a handle 13 is provided with which the locking surface 4 can be moved manually relative to the bottom surface 1 and 2 wheel surface.

In FIG. 1, the wheel chock is shown in a locked position, in which the bottom surface 1 and the wheel surface 2 are locked in a folded, angled state. In this variant of the wheel chock, locking is achieved in that the first end 11 of the locking surface 4 abuts against the hinge 3, which connects bottom surface 1 and wheel surface 2. The hinge thus forms on its inside, between the bottom surface and the wheel surface, a stop 14 for the locking surface 4. The rigid support beams 5 and 6 spread apart the bottom surface 1 and the wheel surface 2 at the opposite end 12 of the locking surface, so that a wedge shape is formed. The geometry of the wheel chock is shown in more detail in FIG. 3.

FIG. 2 shows a partially exploded view of the wheel chock from FIG. 1 from which the individual components are visible. In this case, the area of the wheel surface 2 is shown as an exploded view and the area of the bottom surface 1 is shown in the assembled state, as in FIG. 1.

The bottom surface 1 and wheel surface 2 are designed substantially identical to one another. They are provided as rigid aluminum plates and exhibit a corrugation on the sides intended as outer surfaces of the wheel chock. The corrugation supports a secure grip on the ground and on a wheel to be blocked. The hinge 3 is provided as a rod hinge with a rod 15. At one end of the bottom surface 1 and the wheel surface 2, hinge blocks 16a and 16b are provided with a bearing bushing, which serve as a mounting for the rod 15. When assembled, the hinge blocks 16a and 16b engage between each other and the rod 15 passes through the bearing bushings of the hinge blocks 16a and 16b. The rod is fixed by means of fixing screws 17 in the hinge blocks 16a and 16b.

For the joints 7 and 8, at the other end of the bottom surface 1 and the wheel surface 2, joint blocks 18 are provided which cooperate with joint blocks 19 on the first support beam 5, and on the second support beam 6. The joint blocks 18 and 19 each have bearing bushings. A rod 20 passes through the bearing bushings and connects the joint blocks 18 and 19, so that the joints 8 and 7 arise. Next, the support beams 5 and 6 exhibit joint blocks 21 on their end projecting to the locking surface 4. The locking surface 4 has, on both sides, joint blocks 22 which can engage between the joint blocks 21. The joint blocks 21 and 22 in turn have bearing bushings. The joint blocks 21 and 22 are connected by a rod 23, so that the joints 9 and 10 arise. The rods 20 and 23 are in turn secured by fixing screws 17 in the joint bearings of the joint blocks.

In FIG. 3, the geometry of the wheel chock is shown in a locked position in the unfolded state. A force vector F shows the force of a wheel on the wheel surface 2 of the wheel chock. The force vector F acts in the normal direction of the wheel surface 2. It encloses an angle with the support beam 6 such that the locking surface 4 is forced into the locking position in which its end 11 abuts against the stop 14. For this purpose, an angle α between the force vector F and the support beam 6 on the side of the end of the locking surface 11 is less than 180°. The force of the force vector F generates in the support beam 6 a force component K which acts on the locking surface 4. The angle β between the support beam 6, or the force component K, and the locking surface 4 is greater than 90°. Therefore, the force component K is transformed into a feed force V, which presses the locking surface 4 in the direction of the stop 14. By loading the wheel surface 2, therefore, the locking device of the wheel chock is secured in the locked position. An analogous force profile arises between the bottom surface 1, the support beam 5 and the locking surface 4.

In the present embodiment, the bottom surface 1 and the wheel surface 2 have, e.g., a length of 220 mm and the locking surface 4 has a length of 234.8 mm. The angle α is 148° and the angle β is 99.5°. However, these values are merely exemplary, other angles below 180° for α and above 90° for β and other lengths are also possible.

FIG. 4 shows the wheel chock in its folded position. The locking surface 4 is pulled out relative to the bottom surface 1 and wheel surface 2, so that its end 11 is removed from the stop 14 on the hinge 3. The support beams 5 and 6 extend approximately parallel to the locking surface 4, wherein the joints 7 and 8 rest on the locking surface 4. The bottom surface 1 and the wheel surface are at least approximately parallel to each other. The wheel chock is in a folded-up, flat state in which it can be easily stowed and stored on other folded-up wheel chocks.

It is emphasized that in addition to the embodiment shown in the figures, other embodiments of the wheel chock are possible with the features of the invention. For example, only one support beam can be provided, which is mounted in the manner described between bottom or wheel surface and the locking surface. The respective other of bottom or wheel surface can then, for example, slidably rest on the locking surface. The locking surface can also be moved between the bottom and work surface and brought into abutment with the hinge. However, the wedge angle in this embodiment is only half as large as in the embodiment shown. Furthermore, the stop need not be formed on the hinge. For example, edges can also be provided on the inside of bottom or wheel surface, which edges can serve as a stop for the end of the locking surface. It is conceivable to provide a series of edges, so that an angle of the wheel chock is variable, depending on the edge of the locking surface on which locking is done. Other variations of a wheel chock according to the invention are conceivable.

REFERENCE NUMERAL LEGEND 1 bottom surface
2 wheel surface
3 hinge
4 locking surface
5 first support beam
6 second support beam
7 joint
8 joint
9 joint
10 joint
11 first end locking surface
12 second end locking surface
13 handle
14 stop
15 rod
16 hinge blocks
17 fixing screws
18 joint blocks
19 joint blocks
20 rod
21 joint blocks
22 joint blocks
23 rod
K force component
V feed
F force vector

The invention claimed is:

1. A wheel chock for blocking a stationary wheel comprises:
   a bottom surface for resting on a floor and
   a wheel surface for resting on the stationary wheel, the wheel surface is at an angle to the bottom surface,
   the bottom surface and the wheel surface are interconnected and foldable via a hinge, and
   a locking device is movably arranged on the bottom surface and/or the wheel surface,
   wherein the locking device in a locked position locks the bottom surface and wheel surface in a folded, angled state,
   wherein the locking device has a rigid locking surface and at least one support beam, the support beam at one end is articulated to the locking surface and has a joint at the other end to the bottom and wheel surfaces, so that in a folding position, the locking surface is at least approximately parallel to the bottom or wheel surface and in the locking position, the locking surface, the at least one support beam and bottom or wheel surface are arranged triangularly, and
   wherein in the locked position, the locking surface with one end abuts a stop on the bottom surface or the wheel surface and the end is removed from the stop in the folded position.

2. The wheel chock according to claim 1 wherein the hinge forms the stop between the bottom surface and the wheel surface.

3. The wheel chock according to claim 1 a first support beams and a second support beam are provided and are each mounted with one end on opposite sides of the locking surface, and the first support beam is mounted with its other end on the bottom surface and the second support beam with its other end on the wheel surface.

4. The wheel chock according to claim 1 wherein a force vector encloses an angle in the normal direction of the wheel surface with the at least one support beam, such that the locking device is forced into the locked position.

5. The wheel chock according to claim 2 wherein in the locked position an angle between the support beams and the locking surface is greater than 90°.

6. The wheel chock according to claim 1 wherein at least the wheel surface consists of aluminum.

7. The wheel chock according to claim 1 wherein the wheel chock consists of a stainless metal or a composite material.

8. The wheel chock according to claim 1 wherein the wheel chock on the bottom surface has spikes.

9. The wheel chock according to claim 1 wherein the locking surface has at an end opposite the stop end a handle which in a direction of the locking surface protrudes in the locking position and in the folded position over the bottom surface and the wheel surface.

10. The wheel chock according to claim 1 wherein the locking surface comprises a releasable securing connection, which extends from the locking surface in the direction of the stop to secure the locked surface in the locking position.

11. The wheel chock according to claim 10 wherein the securing connection is an elastic tension connection.

12. A wheel chock is provided for blocking a stationary wheel, having a bottom surface for resting on a floor and a wheel surface for resting on the wheel, wherein the wheel surface for blocking of the wheel is angled to the bottom surface wherein the bottom surface and the wheel surface are interconnected and foldable via a hinge, and a locking device is movably arranged on the bottom surface and/or the wheel surface, which locking device in a locked position locks the bottom surface and wheel surface in a folded, angled state, wherein the locking surface has at its end opposite a stop end a handle which in a direction of the locking surface protrudes in a locking position and in a folded position over the bottom surface and the wheel surface.

* * * * *